Feb. 25, 1947.  A. W. SCHMITZ ET AL  2,416,597
ELECTRIC MOTOR CONTROL SYSTEM
Filed Aug. 19, 1944
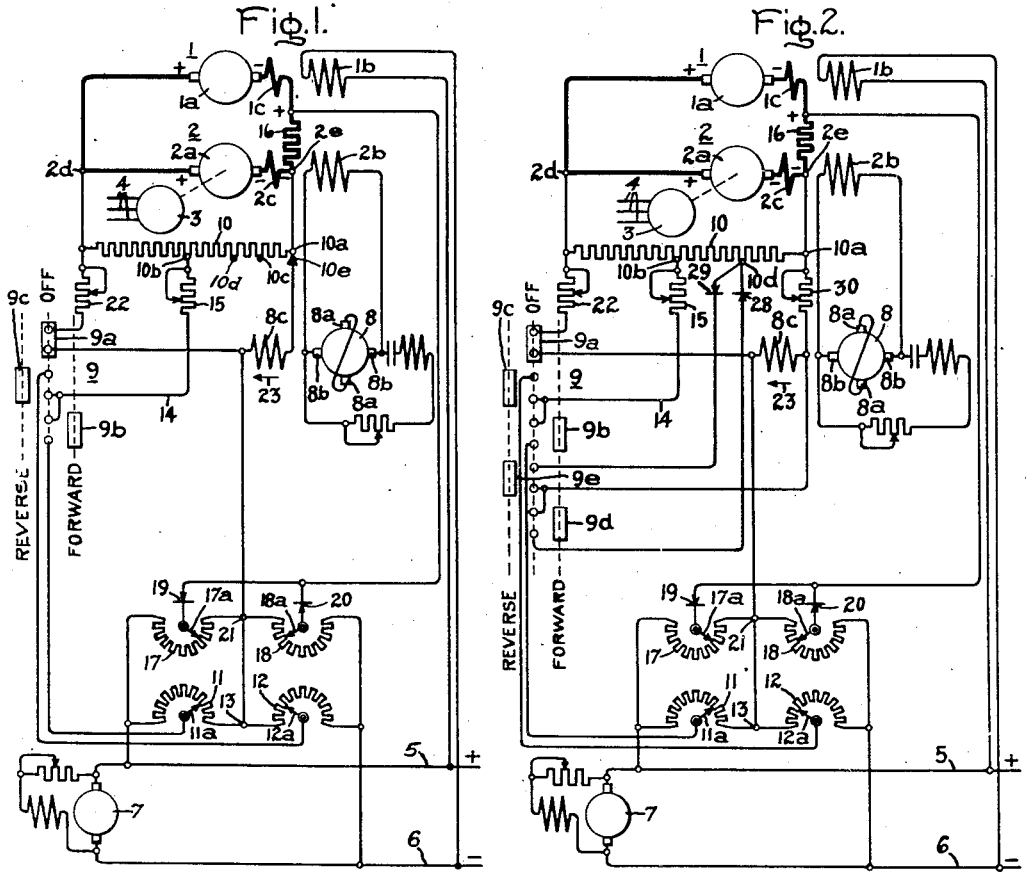
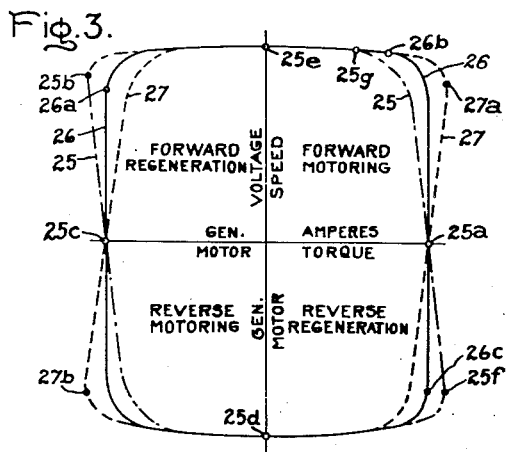
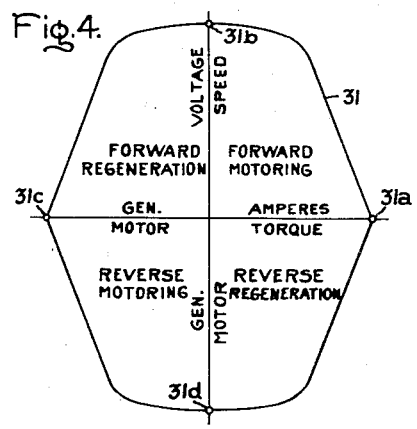
Inventors:
Anton W. Schmitz,
Burnette P. Chausse,
by Harry E. Dunham
Their Attorney.

Patented Feb. 25, 1947

2,416,597

UNITED STATES PATENT OFFICE 2,416,597

ELECTRIC MOTOR CONTROL SYSTEM

Anton W. Schmitz, Scotia, and Burnette P. Chausse, Schenectady, N. Y., assignors to General Electric Company, a corporation of New York Application August 19, 1944, Serial No. 550,193

10 Claims. (Cl. 172—239)

This invention relates to control systems, more particularly to systems for controlling the operation of dynamoelectric machines, and it has for an object the provision of a simple, reliable, and improved control system of this character.

More specifically, the invention relates to the control of a generator such, for example, as an adjustable voltage generator for supplying an electric motor, and a further object of the invention is the provision of a simplified control system for controlling terminal electrical characteristics of the generator such as the terminal voltage and armature current, and the corresponding characteristics of the motor supplied therefrom, i. e., speed and torque.

In carrying the invention into effect in one form thereof, an exciter dynamoelectric machine is provided for supplying exciting current to the dynamoelectric machine which is to be controlled. This exciting dynamoelectric machine is provided with a single control field winding. For controlling the generator voltage, there is provided a source of reference voltage and means for producing a control voltage proportional to the generator voltage. The difference of the reference voltage and the control voltage is utilized to excite the single control field winding of the exciter. A suitable voltage drop device is included in the armature circuit of the controlled machine for producing a signal voltage proportional to the current. This signal voltage is compared with a second reference voltage and the difference is supplied to the control field winding of the exciter in opposition to its main excitation for the purpose of limiting the armature current of the controlled machine to a predetermined value.

In one embodiment of the invention, an additional voltage which is derived from the terminal voltage of the controlled machine is added to oppose the signal voltage across the voltage drop device in the armature circuit, thereby to limit the current to a desired value during regeneration.

The invention provides a very sharp current cutoff in the region between the current limit setting and the stalled motor current. Regenerative currents which are produced either during plugging or normal stopping are limited to a range of values of which the maximum barely exceeds the stalling current and the minimum is slightly less than the stalling current. Other advantages are reduced cost, increased sensitivity and speed of response, and greater simplicity.

For a better and more complete understanding of the invention, reference should now be had to the following specification and to the accompanying drawings of which Fig. 1 is a simple, diagrammatical representation of an embodiment of the invention, Fig. 2 is a modification, and Figs. 3 and 4 are charts of characteristic curves which serve to explain the operation of the modifications of Figs. 1 and 2, respectively.

Referring now to Fig. 1 of the drawing, a motor 1 is connected to drive a suitable load such, for example, as a rolling mill, a steel mill auxiliary, a mine hoist, or an electric shovel. This motor is illustrated as a compound-wound D.-C. motor. The armature 1a of the motor is supplied from an adjustable voltage generator 2 which is driven at a speed that is preferably substantially constant by suitable driving means illustrated as an induction motor 3 which is supplied from a suitable polyphase source represented by the three supply lines 4. The armature 1a of the motor and the armature 2a of the generator are connected in a series loop circuit. The separately excited field winding 1b of the motor is supplied from a substantially constant voltage source of excitation which is represented in the drawing by the exciter buses 5 and 6 which are supplied from an exciter dynamoelectric machine 7. The exciter 7 may be driven by any suitable driving means (not shown).

The generator 2 is provided with a main separately excited field winding 2b and a series commutating field winding 2c. The voltage of the generator 2 can be varied over a wide range by varying its excitation, and to this end, the separately excited field winding 2b is excited by means of a special cross-armature reaction excited direct-armature reaction compensated dynamoelectric machine 8. The dynamoelectric machine 8 differs from a conventional D.-C. machine in that it has a pair of auxiliary brushes 8a arranged on one axis that is normally displaced substantially 90 electrical degrees from the axis of the main load brushes 8b. These auxiliary brushes 8a are substantially short circuited by an external conductor. The machine 8 is provided with a single control field winding 8c which provides a relatively small number of ampere turns. However, the relatively small voltage generated in the armature winding between the auxiliary brushes as a result of the rotation of the armature in the flux of the control field winding causes a very large current to flow in the short circuit. This short circuit current gives rise to a very large cross-armature flux. It is this cross-armature reaction flux which provides the main operating flux or excitation for the machine. The machine 8 is driven by any suitable driving means, such as an induction motor (not shown), at a speed which is preferably substantially constant. Two very important operating characteristics of the armature reaction excited machine 8 which result from the structure described in the foregoing are an exceptionally high speed of response, and a high amplification factor, i. e., the ratio between the watts input to the control field winding and the watts output of the load brush circuit.

The rise and decay of the voltage of the supply generator 2 and consequently the acceleration and deceleration of the motor 1 which is supplied therefrom are under the control of a suitable reversing type master switch 9. The master switch 9 is illustrated as a manually operated master switch and is provided with a normally closed contact 9a, and two normally open contacts 9b and 9c.

For the purpose of regulating the terminal voltage of the generator 2 and, consequently, the speed of the motor 1 to desired values, a control voltage is derived from the terminal voltage of the generator. This control voltage is compared with a reference voltage, and the difference of these two voltages is applied to the control field winding 8c of the armature reaction excited dynamoelectric machine 8. The control voltage is derived from the terminal voltage of the generator by means of a voltage divider 10 which is connected across the generator terminals 2d and 2e. Two oppositely poled reference voltages, one for each direction of rotation of the motor 1, are provided by means of two potentiometers 11 and 12 which are connected in series across the excitation buses 5 and 6. One terminal of the control field winding 8c is connected to the terminal 10a on the voltage divider 10. The other terminal of the control field winding 8c is connected to the junction point 13 of the two potentiometers 11 and 12. The sliders 11a and 12a of these two potentiometers are selectively connected by means of the reversing switch contacts 9b and 9c through a conductor 14 and an adjustable resistor 15, to a fixed contact 10b on the voltage divider 10. The voltage between the adjustable contact 10a and the fixed contact 10b is compared with the reference voltage between the point 13 and one or the other of the sliders 11a, 12a of the potentiometers 11 and 12, and the difference of these two voltages is applied to the control field winding 8c.

In order to limit the armature current of the generator 2 and, therefore, the torque of the motor to desired values, a signal voltage is produced which is proportional to the armature current. This signal voltage is compared with a second reference voltage which is adjusted to correspond to the desired maximum values of armature current and motor torque, and the difference of the signal voltage and second reference voltage is applied to the control field winding 8c in opposition to its main excitation. The signal voltage proportional to armature current is produced by means of a suitable voltage drop device illustrated as a permanent resistor 16 connected in the armature loop circuit of the motor and generator. Instead of this permanent resistor any other suitable voltage drop device could be employed. For example, the voltage drop across either or both of the series commutating field windings 1c and 2c of the motor and generator respectively might be advantageously used.

Two oppositely poled reference voltages for current limit control are produced by suitable means such, for example, as the two potentiometers 17 and 18 which are connected in series relationship across the constant voltage excitation buses 5 and 6. Sliders 17a and 18a of these potentiometers are connected through oppositely poled rectifiers 19 and 20, respectively, to one terminal of the resistor 16. The opposite terminal of the resistor 16 is connected to the terminal of the voltage divider 10 to which one terminal of the control field winding 8c is connected, and the common point 21 between the two potentiometers 17 and 18 is connected to the other terminal of the control field winding 8c. Owing to the presence of the oppositely poled rectifiers 19 and 20 in the connections, the signal voltage across the permanent resistor 16 is compared with one or the other of the oppositely poled reference voltages of the two potentiometers 17 and 18, depending upon the direction of current flow through the permanent resistor 16. The difference of the signal voltage and the selected reference voltage is applied to the control field winding 8c in opposition to its main excitation, thereby to limit the current in the armature loop circuit to a predetermined value. The rectifiers 19 and 20 are so connected that the current limiting operation begins only when the loop circuit current exceeds the preset value and is inactive for all values of loop circuit current less than the preset value. Although the rectifiers 19 and 20 may be of any suitable type, they are preferably of the surface contact type such, for example, as the well-known copper oxide rectifier or the selenium type rectifier.

For the purpose of eliminating the residual magnetism of the generator 2 when the master switch 9 is in the off position, the normally closed contacts 9a complete a connection from the control field winding 8c to the voltage divider 10 to provide reverse excitation of the control field winding 8c. An adjustable resistor 22 is included in this connection for limiting the rate of generator field decay to a predetermined value.

With the foregoing understanding of the elements and their organization in the system, the operation of the system itself will readily be understood from the following detailed description.

It is assumed that the polarity of the excitation bus 5 is positive and that of the bus 6 is negative. It is further assumed that the slider 10e is at the right-hand terminal 10a of the voltage divider 10, as illustrated in the drawing. The sliders 11a and 12a are adjusted to positions corresponding to the desired forward and reverse operating speeds of the motor 1.

If it is desired to operate the motor in the forward direction, the master switch 9 is moved from the central of "off" position in which it is shown to the righthand or "forward" position to open the normally closed contact 9a and close the normally open contact 9b. The opening of contact 9a interrupts the residual magnetism eliminating connection to the control field winding 8c, and the closing of the normally open contact 9b completes the connection from the slider 11a of potentiometer 11 through adjustable resistor 15 to the contact 10b of the voltage divider. As a result of this connection, the voltage between the point 13 and the slider 11a is applied to the circuit of the control field winding 8c and this causes current to flow in the control field winding 8c in the direction indicated by the arrow 23. Since at this instant, the generator voltage is zero, the actual voltage applied to the control field winding 8c may be five or six times the value required to produce full voltage of the generator 2. This results in a very vigorous forcing action which causes the generator voltage to build up rapidly. The polarity of the generator voltage is indicated by the plus and minus signs at the generator terminals. As the generator voltage rises, current is caused to flow in the armature loop circuit and this current causes a voltage drop to appear across the permanent resistor 16 of which the polarity is represented in the drawing by the plus and minus signs. Simultaneously, as the generator voltage builds up, the voltage drop between the contacts 10a and 10b increases in opposition to the reference voltage between the point 13 and the slider 11a, thereby decreasing the voltage applied to the field winding 8c and correspondingly decreasing the forcing action. When the armature loop circuit current attains a value such that the voltage drop across the permanent resistor 16 plus the voltage applied to the control field winding 8c exceeds the voltage drop between the point 21 and the slider 17a of the current limit potentiometer 17, the net voltage across the control field winding 8c begins to decrease and as a result, the armature loop circuit current is limited to a value represented in Fig. 3 by the abscissa of the point 25a. This value of current is the maximum current which is permitted to flow through the armature of the motor and since this current can only flow through the motor when it is at standstill, it is known as the "stalling" current. As a result of this large current flowing in the armature circuit, the motor is accelerated from rest to full speed in accordance with the dash-dot curve 25 of which ordinates represent generator voltage or motor speed and abscissae represent loop circuit amperes or motor torque. When full speed is reached, the armature loop circuit current decreases to the value necessary to drive the load.

If the load on the motor increases to such an extent that the voltage drop across the permanent resistor 16 plus the voltage drop across the control field winding 8c exceeds the reference voltage between the point 21 and the slider 17a, the current limiting action begins to decrease the excitation of the control field winding 8c, thereby reducing the excitation of the generator 2 and the voltage supplied to the motor 1. If the current continues to increase until the sum of the voltage drop across the field winding 8c plus the voltage drop across the permanent resistor 16 exceeds the reference voltage drop between the point 21 and the slider 17a by the amount of the voltage applied to the control field winding 8c, the excitation of the control field winding 8c will decrease to zero and the voltage of the generator will decrease in accordance with the curve 25 until the motor stalls at the value of current indicated by the point 25a.

If it is desired to stop the motor, the master switch 9 is moved to the off position to open the normally open contacts 9b and close the normally closed contacts 9a. Contacts 9b in opening interrupt the connections between the control field winding 8c and the reference voltage potentiometer 11a. In closing, contacts 9a connect the control field winding 8c to the voltage divider 10 for excitation in the reverse direction. Consequently, current flows through the control field winding in a direction which is opposite to that indicated by the arrow 23. As a result, the voltage supplied by the dynamoelectric machine 8 to the generator field winding 2b is reversed and the generator voltage begins to decay. As the generator voltage decays, the motor 1 operates as a generator and causes current to flow in the reverse direction through the armature loop circuit and to drive the generator 2 as a motor. The voltage supplied to the control field winding 8c as a result of the closing of the contact 9a may be several times the amount required for normal excitation, and this forces the generator voltage to decay. The faster the voltage of the generator 2 decays, the larger becomes the reverse pumpback current which the motor supplies to the generator. If it were not for the current limiting feature, the reverse loop circuit current would rise to a very high peak value. The only manner in which this pumpback current can be limited is by preventing the too rapid decay of the generator voltage, i. e., maintaining the generator voltage sufficiently high to limit the pumpback current to the desired value. The increase in the armature lop circuit current to a value at which the sum of the voltage drop across the control field winding 8c plus the voltage drop across the permanent resistor 16 exceeds the reference voltage drop between the point 21 and the slider 18a by the amount of the reverse voltage applied to the control field winding 8c will reduce the excitation of the control field winding 8c to zero. However, this is insufficient to limit the loop circuit current because the generator voltage could still decrease to zero, whereas, if the loop circuit current is to be limited, the generator voltage must be maintained at a high level. Therefore the loop circuit current must increase to a still higher value, i. e., it must increase until the voltage drop across the control field winding 8c plus the voltage drop across the permanent resistor 16 exceeds the reference voltage between the point 21 and the slider 18a by an amount sufficient to cause normal excitation current to flow through the control field winding 8c in the original direction, i. e., the direction of the arrow 23. As a result, the loop circuit current is limited to a value represented in Fig. 3 of the drawing by the abscissa of the point 25b. This regenerative or pumpback current peak exceeds by a small amount the stalling current which is represented by the point 25a.

A reversal of the motor from the forward to the reverse direction is accomplished by a rapid movement of the master switch from the forward to the reverse position. In the off position of the master switch, the normally open contacts 9b are opened thereby to interrupt the connections from the potentiometer 11 to the control field winding 8c, and the normally closed contacts 9a are closed to connect the control field winding to the voltage divider 10 for reverse excitation. Consequently, the initial deceleration during reversal is the same as the initial deceleration during the stopping operation described in the foregoing. In the reverse position of the master switch, the contacts 9a are open and the contacts 9c are closed so that the oppositely poled voltage of potentiometer 12 is utilized as the reference voltage. At this point in the operation, the voltage of the generator 2 has not had sufficient time to reverse and is therefore still in the original direction. Consequently, the voltage between the terminal 10a and the connection point 10b of the voltage divider 10 adds to the reference voltage of the potentiometer 12 to continue the current flow through the control field winding 8c in the reverse direction which was initiated in the off position of the master switch. The remainder of the deceleration including the current limiting operation is the same as the deceleration during stopping and is in accordance with the curve 25. The pumpback current in the armature loop circuit reaches a peak value at the point 25b and decreases to the stalled motor current value at the point 25c. The magnitude of the current represented by the abscissa of the point 25c is the same as the magnitude of the stalled motor current represented by the abscissa of the point 25a.

The acceleration in the reverse direction is in accordance with the characteristic curve 25 below the zero axis between the points 25c and 25d. It is similar to the acceleration in the forward direction which is represented by the portion of the curve 25 above the zero axis between the points 25a and 25e. The current limiting action during operation in the reverse direction is generally the same as during operation in the forward direction. However, the current signal voltage across the resistor 16 has the reverse polarity and owing to the selective action of the oppositely poled rectifiers 19 and 20, it is compared with the reverse polarity reference voltage of potentiometer 18.

A reversal from operation in the reverse direction to operation in the forward direction is accomplished by a rapid movement of the master switch from the reverse position to the forward position. The resulting deceleration is in accordance with the portion of the curve 25 below the zero axis between the points 25d and 25a. The plugging current, i. e., the pumpback current flowing in the armature loop circuit during reversal reaches a peak of which the magnitude is represented by the abscissa of the point 25f.

As indicated by the curve 25, the plugging current peaks represented by the points 25b and 25f exceed the stalled motor currents which are represented by the points 25a and 25c. In order to avoid damage to the driven machine, it is sometimes desirable that the plugging current shall not exceed the stalled motor current, and in certain cases shall even be less than the stalled motor current. This is accomplished in the present invention by changing the position of the connection of the control field winding 8c to the voltage divider 10. By moving the slider 10e to the point 10c, a voltage drop is added to the voltage drop of the permanent resistor 16 from which the current limit signal voltage is obtained.

During the deceleration period of the reversal operation, the polarity of the voltage drop across resistor 16 is reversed, whereas the polarity of the generator voltage and therefore the polarity of the voltage drop between the terminal 10a and the point 10c of the voltage divider remain unchanged. Thus, the voltage drop between the points 10a and 10c is of the same polarity in the current limit control circuit as that of the reversed voltage drop across the resistor 16. Consequently, the current limiting action is initiated at a lower value of armature loop circuit current. This operating condition is represented by the curve 26 of which the abscissa of the point 26a represents the maximum value of the pumpback current. It is less than the value represented by the abscissa of point 25b and does not exceed the stalled motor current represented by the abscissae of the points 25a and 25c.

During the motoring operation, the polarity of the additional voltage drop between the terminal 10a and the point 10c is opposite to the polarity of the voltage drop across the resistor 16. Consequently, in order to initiate the current limiting action during the motoring operation, it is necessary for the armature loop circuit current to increase to a value such that the effect of this reverse polarity voltage which is added into the current limiting control circuit is counteracted by the increased voltage drop across the resistor 16. This operating condition is illustrated in Fig. 3 by the curve 26 of which the abscissa of the point 26b represents the value of the loop circuit current at which the current limiting action is initiated. This current is greater than the current represented by the abscissa of the point 25g which represents the current at which the limiting action is initiated when the connection of the control field winding is made at the point 10a on the voltage divider. It does not exceed the stalling current, the magnitude of which is represented by the abscissa of the point 25a.

The operation in the reverse direction is represented by the portion of the curve 26 below the zero axis. The maximum plugging current for this direction of rotation is represented by the abscissa of the point 26c. The change in position of the connections from the point 10a on the voltage divider to the point 10c has no effect on the stalled motor current, since the voltage across the divider is substantially zero at zero speed of the drive motor. Thus the stalled motor current for the operating condition represented by the characteristic curve 26 coincides with the points 25a and 25c of which the abscissae represent the magnitudes of the stalled motor current for the operating condition represented by the curve 25.

By moving connections to the point 10d, on the voltage divider, the operation is in accordance with the curve 27. For this operating condition, the plugging peaks are eliminated, i. e., the maximum pumpback currents at all speeds are less than the stalled motor current. However, the motoring current, i. e., the current flowing in the armature loop circuit when the motor is operating as a motor, attains peak values which are represented by the abscissae of the points 27a and 27b, respectively, which are in excess of the stalled motor currents represented by the points 25a and 25c. In certain applications, these high transient motoring current peaks are undesirable, and an operating characteristic is desired in which both motoring current peaks and plugging current peaks are eliminated. Operating characteristics of this type are obtained with the system illustrated in the modification of Fig. 2. In this modification, elements which are identical with corresponding elements in the modification of Fig. 1 are denoted by the same reference characters. The modification of Fig. 2 differs from the modification of Fig. 1 primarily in that the connection from the control field winding 8c to an intermediate point such as the point 10d on the voltage divider 10 is selectively completed through one of two parallel paths, of which the first comprises a rectifier 28 and a normally open contact 9d on the forward side of the master switch 9, and the second comprises an oppositely poled rectifier 29 and a normally open contact 9e on the reverse side of the master switch. An additional connection from the upper terminal of the control field winding 8c to the terminal 10a is made through an adjustable resistor 30.

In operation when the master switch 9 is in the forward position, and the contact 9d is closed, the rectifier 28 excludes the portion of the voltage divider between the terminal 10a and the point 10d from the current limit control circuit which therefore passes through the parallel connected resistor 30. Consequently, the operation is similar to that of the modification of Fig. 1 with the control field winding 8c connected to the terminal 10a of the voltage divider 10. This operation is graphically represented in Fig. 4 by the portion of the curve 31 between the points 31a and 31b which corresponds to the portion of the curve 25 of Fig. 3 between the points 25a and 25e. When the master switch is thrown to the reverse position to reverse the excitation of the control field winding 8c, the contact 9d is opened and the contact 9e is closed. The oppositely poled rectifier 29 permits the voltage drop between the terminal 10a and the point 10d to be added to the current signal voltage drop across the resistor 16 of which the polarity is now reversed, owing to the reversal of current flow in the armature loop circuit. Consequently, the operation is similar to that of the modification of Fig. 1 with the control field winding 8c connected to the point 10d of the voltage divider and is represented graphically in Fig. 4 by the portion of the curve 31 between the points 31b and 31c which corresponds to the portion of the curve 27 of Fig. 3 between the points 25e and 25c.

In starting from rest and accelerating in the reverse direction, the polarities of the voltages across the voltage divider 10 and the resistor 16 are opposite to those indicated in Fig. 2, and the rectifier 29 excludes the portion of the voltage divider 10 between the points 10a and 10d from the current limit control circuit. The operation is therefore similar to the same operation in the forward direction and is graphically represented by the portion of curve 31 between the points 31c and 31d.

The decelerating operation during a reversal from reverse rotation to forward rotation is similar to the deceleration during the reversal from forward to reverse rotation and is represented graphically by the portion of the curve 31 between the points 31d and 31a.

By varying the adjustable resistor 30, the sharpness of the cutoff of the current limiting action can be varied. In other words, by varying the resistor 30, the slope of the curve 31 in the current limiting region is varied. Decreasing the resistance of the adjustable resistor 30 increases the sharpness of the cutoff and increasing the resistance decreases the sharpness of the cutoff.

Although in accordance with the provisions of the patent statutes this invention is described as embodied in concrete form and the principle thereof has been explained, together with the best mode in which it is now contemplated applying that principle, it will be understood that the apparatus shown and described is merely illustrative and that the invention is not limited thereto, since alterations and modifications will readily suggest themselves to persons skilled in the art without departing from the true spirit of this invention or from the scope of the annexed claims.

What we claim as new and desire to secure by Letters Patent of the United States, is:

1. A control system for a main dynamoelectric machine comprising a first source of reference voltage, means for producing a first control voltage proportional to the terminal voltage of said machine, means for maintaining said terminal voltage substantially constant at a predetermined value comprising an exciter dynamoelectric machine connected to supply exciting current to said main machine and provided with a control field winding excited by the difference of said control voltage and said reference voltage, and means for supplying a voltage of opposite polarity to said control field winding to limit the armature current of said main machine to a predetermined value comprising a second source of reference voltage, means for producing a signal control voltage proportional to the armature current of said main machine, a control circuit for supplying the difference of said signal voltage and second reference voltage to said control field winding, and means for supplying to said control circuit a voltage derived from said first control voltage and having a polarity opposite to the polarity of said current signal control voltage.

2. A control system for a main dynamoelectric machine comprising a first source of reference voltage, means for producing a control voltage proportional to the terminal voltage of said machine, means for maintaining said terminal voltage substantially constant at a predetermined value comprising an exciter dynamoelectric machine connected to supply exciting current to said main machine and provided with a control field winding excited by the difference of said control voltage and said reference voltage, means for supplying a voltage of opposite polarity to said control field winding to limit the armature current of said main machine to a predetermined value comprising a second source of reference voltage, means for producing a signal control voltage proportional to the armature current of said main machine and connections for supplying the difference of said signal voltage and second reference voltage to said control field winding, and a blocking rectifier included in said connections for maintaining said current limiting means inactive until said signal voltage exceeds said second reference voltage.

3. A control system for a main dynamoelectric machine comprising a pair of oppositely poled sources of a first reference voltage, means for selecting one of said sources, means for deriving a control voltage from the terminal voltage of said machine comprising a voltage divider connected across the terminals of said machine, means for controlling said terminal voltage comprising an exciter dynamoelectric machine connected to supply exciting current to said main machine and provided with a control field winding connected to be excited by the difference of the reference voltage of the selected source and said derived voltage, and means for supplying an opposing voltage to said control field winding to limit the armature current of said main machine comprising two oppositely poled sources of a second reference voltage, a voltage drop device connected in the armature circuit of said main machine for producing a signal voltage proportional to current, and connections including two rectifiers reversely connected in parallel for supplying to said control field winding the difference of said signal voltage and one of said second reference voltages corresponding to the direction of said armature current.

4. A control system for a main dynamoelectric machine comprising an adjustable potentiometer for producing a reference voltage, means for deriving a control voltage from the terminal voltage of said machine comprising a voltage divider connected across the armature of said machine, means for maintaining the voltage of said machine constant at a predetermined value comprising an exciter dynamoelectric machine connected to supply excitation to said main machine and provided with a control field winding connected to be excited by the difference of said voltages, means for supplying a voltage of opposite polarity to said control field winding to limit the armature current of said main machine to a predetermined value comprising a second adjustable potentiometer for producing a second reference voltage, a voltage drop device connected in the armature circuit of said main machine for producing a signal voltage proportional to current, and connections for supplying the difference of said second reference voltage and said signal voltage to said control field winding, and a blocking rectifier included in said connections for maintaining said current limiting means inactive until said current signal voltage exceeds said second reference voltage.

5. A control system comprising an adjustable voltage generator, an electric motor supplied from said generator, voltage regulating means for said generator comprising a source of a first reference voltage, means for deriving a control voltage from said generator comprising a voltage divider connected across the terminals thereof, and an exciter dynamoelectric machine connected to supply excitation current to said generator and provided with a control field winding connected to be excited by the difference of said voltages, means for supplying an opposing voltage to said control field winding to limit the current supplied to said motor to a predetermined value comprising a source of a second reference voltage, a voltage drop device connected in the armature circuit of said generator for producing a signal voltage proportional to current and connections for supplying the difference of said signal voltage and second reference voltage to said control field winding, means for reversing the excitation of said control field winding to reverse the direction of rotation of said motor, and means for adjusting said connections to include a voltage drop derived from a portion of said voltage divider and of opposite polarity with respect to the voltage of said voltage drop device during motoring operation of said motor thereby to limit the plugging current of said armature circuit to a predetermined value.

6. A control system comprising an adjustable voltage generator, an electric motor supplied from said generator, voltage regulating means for said generator comprising a pair of oppositely poled sources of a first reference voltage, means for selecting one of said sources, means for deriving a control voltage from said generator comprising a voltage divider connected across the terminals of said generator, and an exciter dynamoelectric machine provided with a control field winding connected to be excited by the difference of the reference voltage of the selected source and said derived voltage, and means for supplying an opposing voltage to said control field winding to limit the current exchanged between said generator and motor to a predetermined value comprising two oppositely poled sources of a second reference voltage, a voltage drop device connected in the armature circuit of said generator for producing a signal voltage proportional to current, and connections including two reversely connected rectifiers for supplying the difference of said signal voltage and one of said second reference voltages to said control field winding.

7. A control system for a main dynamoelectric machine comprising a pair of oppositely poled sources of a first reference voltage comprising a pair of series connected potentiometers, means for deriving a control voltage from the terminal voltage of said machine comprising a voltage divider connected across the terminals of said machine, a master switch for selectively connecting an intermediate point of said divider to an intermediate point of one of said potentiometers, means for controlling said terminal voltage comprising an exciter dynamoelectric machine connected to supply exciting current to said main machine and provided with a control field winding having a first terminal connected to the common point of said potentiometers and its other terminal connected to a point on said voltage divider to be excited by the difference of said control voltage and said selected voltage, and means for supplying an opposing voltage to said control field winding to limit the armature current of said main machine comprising two oppositely poled sources of a second reference voltage comprising a second pair of series connected potentiometers having their common point connected to said first terminal of said control field winding, a voltage drop device connected in the armature circuit of said main machine for producing a signal voltage proportional to armature current and having one terminal connected to the other terminal of said control field winding, and parallel connections including reversely connected rectifiers from the other terminal of said voltage drop device to intermediate points of said second potentiometers for supplying to said control field winding the difference of said signal voltage and one of said second reference voltages corresponding to the direction of said armature current.

8. A control system comprising an adjustable voltage generator, an electric motor supplied from said generator, voltage regulating means for said generator comprising two potentiometers for producing oppositely poled first reference voltages, means for selecting one of said potentiometers, means for deriving a control voltage from said generator comprising a voltage divider connected across the terminals of said generator, and an exciter dynamoelectric machine having a control field winding connected to be excited by the difference of the reference voltage of the selected potentiometer and said derived voltage, and means for supplying an opposing voltage to said control field winding to limit the current exchanged between said generator and said motor to a predetermined value comprising two potentiometers for producing oppositely poled second reference voltages, a voltage drop device connected in the armature circuit of said generator for producing a signal voltage proportional to current, and connections including two oppositely poled rectifiers for supplying the difference of said signal voltage and one of said second reference voltages to said control field winding.

9. A control system for a generator comprising a source of reference voltage, means for deriving a control voltage from the terminal voltage of said generator comprising a voltage divider connected across the terminals of said generator, means for supplying an exciting current to said generator comprising an exciter dynamoelectric machine provided with a control field winding, means for completing connections from said control field winding to said source and said voltage divider to excite said control field winding by the difference of said reference voltage and said control voltage, means for interrupting the connections to said source to deenergize said generator, and means for connecting said control field winding to said voltage divider for reverse excitation thereby to force the decay of said generator field and substantially eliminate the residual magnetism thereof.

10. A control system comprising an adjustable voltage generator, an electric motor supplied therefrom, voltage regulating means for said generator comprising a pair of oppositely poled sources of a first reference voltage, a voltage divider connected across the terminals of said generator and an exciter dynamoelectric machine provided with a control field winding connected to be excited by the difference of said voltages, means for supplying an opposing voltage to said control field winding to limit the current supplied to said motor to a predetermined value comprising a pair of oppositely poled sources of a second reference voltage, a voltage drop device connected in the armature circuit of said generator for producing a signal voltage proportional to current and connections from said control field winding to said voltage drop device and a selected one of said sources of second reference voltage for supplying the difference of said signal voltage and the voltage of said selected source to said control field winding, a portion of said voltage divider being included in said connections for adding a voltage of opposite polarity to the voltage of said voltage drop device thereby to limit the armature current during regenerative operation of said motor, means for reversing the excitation of said control field winding to reverse the direction of rotation of said motor, and a pair of parallel connected reversely poled rectifiers included in said connections and selectively controlled by said reversing means for rendering said portion of said voltage divider ineffective during motoring operation.

ANTON W. SCHMITZ.
BURNETTE P. CHAUSSE.

REFERENCES CITED

The following references are of record in the file of this patent:

UNITED STATES PATENTS

| Number | Name | Date |
|---|---|---|
| 2,329,538 | Huston | Sept. 14, 1943 |
| 2,255,064 | King | Sept. 9, 1941 |
| 2,278,519 | King et al. | Apr. 7, 1942 |
| 2,357,087 | Alexanderson | Aug. 29, 1944 |